United States Patent [19]

Vejmelka et al.

[11] Patent Number: 4,533,395

[45] Date of Patent: Aug. 6, 1985

[54] METHOD OF MAKING A LEACH RESISTANT FIXATION PRODUCT OF HARMFUL WATER-CONTAINING WASTE AND CEMENT

[75] Inventors: Peter Vejmelka; Wolfgang Kluger, both of Leopoldshafen; Rainer Köster, Karlsruhe-Groetzingen; Wolfgang Hauser, Stutensee-Fr., all of Fed. Rep. of Germany

[73] Assignee: Kernforschungszentrum Karlsruhe GmbH, Karlsruhe, Fed. Rep. of Germany

[21] Appl. No.: 570,658

[22] Filed: Jan. 13, 1984

[30] Foreign Application Priority Data

Sep. 13, 1983 [EP] European Pat. Off. ........ 83109027.9

[51] Int. Cl.$^3$ ............................................. G21F 9/16
[52] U.S. Cl. .......................................... 106/89; 106/90; 106/97
[58] Field of Search ................................ 106/89, 90, 99

[56] References Cited

U.S. PATENT DOCUMENTS

| | | |
|---|---|---|
| 3,947,283 | 3/1976 | Uchikawa et al. ............... 106/89 |
| 3,947,284 | 3/1976 | Kitsugi ............................. 106/90 |
| 4,017,417 | 4/1977 | Clark et al. ....................... 106/97 |
| 4,113,504 | 9/1978 | Chen et al. ....................... 106/97 |
| 4,116,705 | 9/1978 | Chappell ........................... 106/97 |
| 4,142,912 | 3/1979 | Young .............................. 106/97 |
| 4,209,335 | 6/1980 | Katayama et al. ................ 106/97 |
| 4,226,631 | 10/1980 | Kubota ............................ 106/97 |
| 4,379,081 | 4/1983 | Rootham et al. ................. 106/97 |

Primary Examiner—William R. Dixon, Jr.
Assistant Examiner—Ann M. Knab

[57] ABSTRACT

A solid fixation product of harmful, water-containing waste materials and cement, which product is highly resistant to leaching by water and salt solutions. The product has a high content of 20 to 50% of waste materials based on the dry weight of the waste in the product and a water content corresponding to a water-to-cement ratio of 0.2 to 0.45. The method according to the invention which permits producing of such products is characterized in that evaporation of the water-containing waste materials and the mixing with the fixation matrix takes place concurrently at temperatures of 100° to 180° C. The resulting solid fixation product is of relatively small volume and, accordingly, requires only relatively little storage space.

9 Claims, 1 Drawing Figure

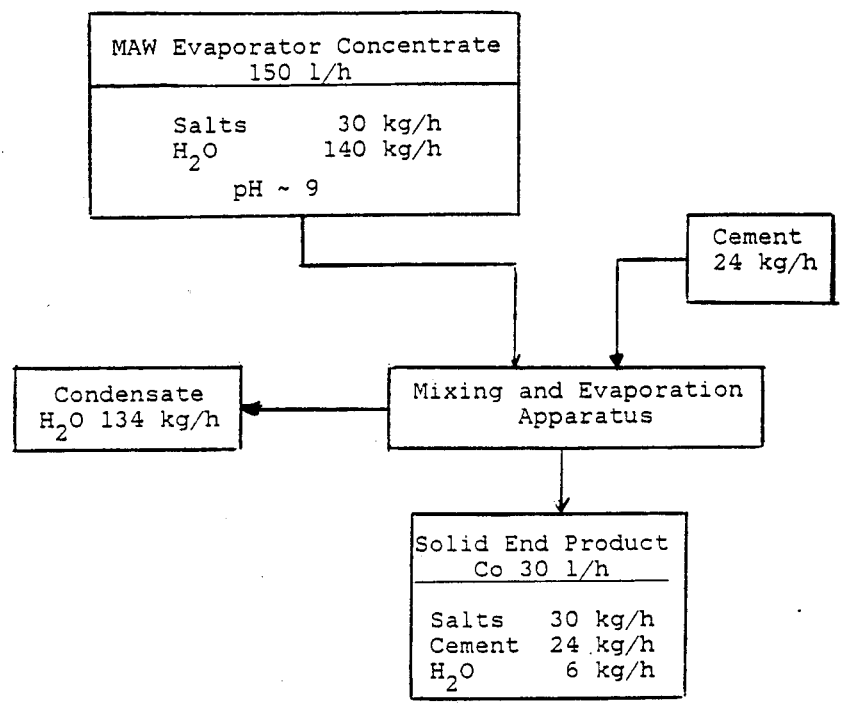
SIMPLIFIED FLOW SCHEMATIC
FIG.

METHOD OF MAKING A LEACH RESISTANT FIXATION PRODUCT OF HARMFUL WATER-CONTAINING WASTE AND CEMENT

FIELD OF THE INVENTION

The invention relates to a method of making a fixation product of harmful water-containing waste materials and cement with or without additives (fixation matrix).

BACKGROUND OF THE INVENTION

Solid end products of harmful water-containing waste materials and cement with or without additives such as metal oxides, metal hydroxides, silicates of the alkaline or alkaline-earth metals or aluminosilicates, have been known for some time (DE-AS No. 2,426,641). Such solid products, however, contain only a relatively small amount of harmful wastes, generally less than 10% by weight based on the dry weight of the waste in the end product or the end product may have a water content of substantially more than 45% by weight on a water-to-cement basis or both.

Harmful water-containing wastes are aqueous solutions or slurries such as slurries having suspended therein compounds which are harmful or dangerous for the biocycle, for example, poisonous or radioactive compounds. The solid end products of this type known so far have certain limits given by either the water-to-cement ratio, that is, the water-to-fixation compound ratio or the charging of the fixation compounds with waste.

The smaller the volume of aqueous waste in relation to the fixation compounds, the smaller is the portion of harmful waste in the end product and also, the smaller is the relative amount of water-to-fixation compounds (weight percent to weight percent) in the end product.

If the volume of the aqueous waste to be solidified is increased while the amount of fixation compounds remains unchanged, then the weight percent of dry waste is increased in the end product but the weight ratio of water-to-fixation compounds is also increased which, however, is only possible to a point that depends on the type of fixation matrix. Any amount of liquid to be solidified beyond that point cannot be contained by the fixation matrix. As a consequence of an addition of an excessive amount of liquid, the fixation matrix will not solidify or, if the fixation matrix can solidify, it will bleed liquid, that is, water or watery solutions will be left over after solidification of the matrix. In this connection, it is not foreseeable whether this bleed liquid contains harmful waste materials. Certainly, it is not reasonable to undergo a solidification process and, after solidification, have harmful liquid waste left over.

The aqueous waste may be concentrated, for example, aqueous salt solutions may be subjected to evaporation so that the concentration of harmful waste in the end product is increased by a certain amount but this may cause problems with regard to the quality of solidification. In order to obtain a sufficiently large concentration of waste material, the aqueous solutions would have to be concentrated to such a degree that mechanical problems would occur which may render the process impossible to practice; for example, crystallization, transport problems, clogging by dried compounds might occur. The salt content of the end products which are made in accordance with presently known methods, particularly by encapsulating in barrels with cement, is limited by the salt concentration in the waste solution. The solidification of aqueous waste with a content of harmful salts of about 40% by weight leads to solid end products with a salt content of not more than 16% by weight in spite of the fact that the waste-to-cement ratio is about 0.4.

The higher the water-cement value, that is, the weight ratio of water-to-solidification compound, in the end product, the smaller is the resistance of the solid end product to leaching by water or salt solutions. In addition to high resistance against leaching, it is necessary that the solid end product has also a relatively high mechanical strength. Of solid end products containing radioactive waste, a compression strength of 10 N/mm$^2$ or more is required. Also, for harmful materials there should be:

on the average, a leaching rate of better than $10^{-3}$ g/cm$^2$ per day (when measured over the period of a year), a differential leaching rate of better than $10^{-4}$ g/cm$^2$ per day (as measured at the end of the first year), and a diffusion parameter of better than $10^{-4}$ cm$^2 \times$ d$^{-1}$.

Only if these conditions are fulfilled, the end product may be considered leach resistant.

It is the object of the present invention to provide a solid fixation product of harmful aqueous waste materials and a fixation matrix on the basis of an inorganic solidification compound, which fixation product is resistant to leaching by water and water solutions and is capable of containing a relatively large amount of waste in combination with a low water-to-solidification compound ratio. The fixation products shall have good mechanical properties, a good leach resistance and at least the retaining qualities of the known fixation products (with much lower content of harmful waste in the solid end product). The novel solid fixation product shall be producible in a continuous as well as in a batch-type process and, in any case, shall have especially crushing strength and leach resistance. It is, furthermore, an object of the present invention to provide a method of making such solid fixation products.

SUMMARY OF THE INVENTION

A method of making a solid fixation product of harmful water-containing waste materials and cement with or without additives (fixation matrix) which is resistant to leaching by water or salt solutions and which is composed of 20 to 50% by weight of harmful waste based on the dry weight of the waste in the solid end product and a water content in the end product corresponding to a water-to-cement ratio of 0.2 to 0.45 (water-cement number).

If the waste materials are ion exchanger resins charged with poisonous waste, the amount is 26 to 50% by weight.

Preferably, the solid fixation product:
(a) contains 33 to 50% by weight of harmful waste materials based on the dry weight of the waste in the end product (solid fixation products), and
(b) has a water content corresponding to a water-to-cement ratio of 0.20 to 0.40.

In the method according to the invention, in which the water-containing waste materials are concentrated by evaporation and in which the concentrate is mixed with the fixation matrix and solidified, the evaporation process and the mixing process are performed concurrently at temperatures of 100° C. to 180° C. The evaporation and mixing time is adjusted so as to obtain a water content in the end product corresponding to a water-cement number of 0.2 to 0.45.

Evaporation and mixing may be performed on a continuous basis in a continuous mixer; but it may also be performed in a batch-type operation in a container. If necessary, evaporation and mixing is performed in the presence of a setting retardant. Also, evaporation and mixing may be performed in a vacuum environment of 20 to 50 m bar.

It has been impossible, so far, to make leach-resistant solid end products of harmful aqueous waste materials which have a fixation matrix of mainly inorganic fixation materials which had such a high content of harmful waste materials in the end product.

The product according to the invention has a number of important advantages:

For example, the waste volume in the end product to be disposed of is substantially reduced when compared with the volume before fixation, that is, the volume of the solid product is only slightly larger than the volume of the dry portion of the waste because of the addition of only a relatively small amount of fixation materials. The solid end products are easy to produce in spite of a relatively large waste content and they may be produced with relatively low costs, little space, and small expenditure in time.

It has already been proposed in connection with the fixation of radioactive waste water to concentrate the waste water by evaporation even to such a degree that a dry residue is obtained and thereafter admix the dry residue to an encapsulation material for solidification but such a process encounters problems since the relatively high viscosity of the pasty encapsulation material results in a relatively low limit for the content of waste material in the encapsulation material. If such dry residue is admixed to the cement paste, the high waste content in the end product, as it is possible with the process in accordance with the invention, cannot be obtained and the relatively low water-cement number is exceeded. In order to obtain a high waste loading of the end product, a certain amount of bentonite has been added to the encapsulating material, particularly water-absorbing bentonite, but this resulted in an increase of the viscosity of the cement paste so that it could not be properly mixed unless additional water was added to compensate for that disadvantage.

A continuous encapsulation process in which a water-based encapsulating compound is the main component of the encapsulation matrix is known from DE-OS 32 02 518. As described therein, radioactive and/or poisonous materials containing water and/or crushed radioactive and/or poisonous solid materials are embedded in an encapsulating material mixture which solidifies and the mixture is filled into barrels or containers. In the process according to this German Laying-Open-Print, the principal idea is to mix the inactive materials such as cement and sand and the radioactive liquid materials such as evaporator concentrates or slurries so as to produce a volume which is as small as possible and thereafter fill it into containers. The arrangement is to be as small as possible and as much as possible of such materials are to be solidified in the smallest possible space resulting also in a saving in encapsulating compounds. Especially equipment and machine parts which are contaminated by radioactive materials should require the least possible volume after their embedment into a solidifying encapsulating material mixture. This is achieved in accordance with the German OS in that a dry encapsulating material mixture is introduced into a radiation protective chamber or similar containment and is mixed therein with the materials to be encapsulated and the mixture is then permitted to set. It is said that it is particularly advantageous if the encapsulating material is mixed with radioactive or poisonous water so as to harden thereafter. With this method, not only radioactive particulate materials but also the radioactive water are solidified. The pre-mixed encapsulating materials (mortar mixture), the particulate radioactive solid materials and finally radioactive ion exchange resins are introduced into a continuous mixer by means of augers and are mixed in a mixing zone with radioactive water or slurries by means of a mixing paddle wheel. Process conditions such as the amount and consistency of the encapsulating materials, the ratio of amounts of encapsulating materials to radioactive and/or poisonous water or similar, the ratio of amounts of encapsulating materials to radioactive or poisonous crushed solid materials, the ratio of amounts of encapsulating materials to radioactive or poisonous ion exchanger resins, etc., are not addressed in the above German OS. It must therefore be assumed that this process operates under the known conditions as usually employed. Increased waste loading and, at the same time, a low water-cement number cannot be achieved with this method.

Suitable fixation matrix materials for the method according to the invention are, for example, cements on the basis of Portland cement such as the Portland cements themselves, blast furnace cements, trass cements, pozzuolona cements, etc., or water-setting ceramic cements such as deep drill cements. The cements may be utilized each alone or in any suitable mixture of two or more of the cements or in the form of mixtures with additives of, for example, alkali- or alkaline-earth silicate, etc.

Under normal conditions, as they are prevalent, for example, in the building industry, the setting and hardening of cement is accelerated at higher temperatures. This effect is utilized, for example, by hardening concrete and cement building blocks at higher temperatures in autoclaves in order to obtain their final strength already after a relatively short time (one day as compared to one week). Under such conditions, the setting takes place already within a few minutes.

It has now been found during research concerning the fixation with cement of $NaNO_3$ containing radioactive waste concentrates that those mixtures with cement (Portland cement or blast furnace cement) can, surprisingly, be treated over extended periods of time (45–60 minutes) at temperatures of up to 180° C. without resulting in a premature setting. The end products are hardened after several hours and, after 28 days, have achieved a crush resistance comparable to that of the products made in accordance with the known methods.

It becomes, therefore, possible to produce, in a single process step (combined mixing and evaporating), cement products with a low water-cement number, that is, with a higher salt content, than it is possible with the known "in-barrel cementing" methods.

In comparison with the known two-stage process, in which the waste water is first evaporated and the dry residue is then mixed with cement paste in separate process steps, the process according to the present invention has a number of advantages.

It is a one-step process which may be operated either in a continuous or a batch-type fashion.

Material dosage is facilitated since only cement and the (for example) waste or waste concentrates have to be mixed in a reaction vessel, that is, the only solid material which needs to be admetered is the cement; there is no evaporation residue to be admetered which is difficult since it generally includes lumps and tends to stick together.

An important advantage of the process according to the present invention resides further in the fact that it may be performed in a continuous operation and that the waste content of the end product is easily controllable in a wide range by adjustment of the composition of the initial mixture and the degree of evaporation in the mixer. Another advantage is found in the fact that the higher concentration of radioactive materials in the final storage containers, although providing for increased radioactivity in the containers, results in a substantially reduced expenditure in shielding materials:

Taking, for example, 400 l barrels with cast iron shielding walls in connection with the encapsulation therein of radionuclide Cobalt-60: If the shielding wall thickness of such barrels is doubled, the volume of the shielding material is increased by a factor of 2.5. However, the Cobalt-60 radioactivity admissible within the container may be increased by a factor of 40. This relationship becomes even more favorable with further increased radioactivity. For the encapsulation of concentrates of medium-(radio)active wastes (MAW-concentrates), the respective ratios are even more favorable since the nuclide spectrum in those encapsulation products contains low energy gamma radiation which will not penetrate the shielding walls of increased thickness and, therefore, do no longer need to be taken into consideration.

Hereafter, the invention is illustrated on the basis of a simplified flow scheme given in the single FIGURE. Encapsulation examples of aqueous wastes are given as follows:

EXAMPLE 1

A prepared solution representing an evaporation concentrate (MAW-concentrate) in accordance with the data as given in FIG. 1 was introduced into a heatable mixing auger. The composition of the concentrate is given in Table 1. A flow of 150 l/h was maintained into which Portland cement 35F was metered at a rate of 24 kg/h. A process temperature of between 130° and 180° C. was maintained. A fixation mixture was produced at a rate of 30 l/h which included 30 kg/h of salts, 24 kg/h of cement and 6 kg/h of water. The fixation mixture was discharged from the mixing auger into a waste container in which it hardened. The solid end product contained 50 wt.% of salts and the water-cement number was 0.25. The steam escaping during mixing and evaporation amounted to 134 kg/h of condensate.

TABLE 1

| COMPOSITION OF THE MAW CONCENTRATE | |
|---|---|
| Element or Compound | Concentration in g/l |
| $NaNO_3$ | 300 |
| Al | 0.23 |
| Ca | 1.5 |
| Cr | 0.08 |
| Cu | 0.15 |
| Fe | 0.38 |
| K | 0.08 |

TABLE 1-continued

| COMPOSITION OF THE MAW CONCENTRATE | |
|---|---|
| Element or Compound | Concentration in g/l |
| Mg | 0.75 |
| Mn | 0.08 |
| Mo | 0.38 |
| Ni | 0.08 |
| Ru | 0.15 |
| Zr | 0.15 |
| Sodium oxalate | 5 |
| Sodium tartrate | 5 |
| EDTA | 1 |
| NaF | 1 |
| Tensid (Marlox FK 64) | 1 |
| Tensid (Marlophen 812) | 1 |
| $Na_2HPO_4$ | 5 |
| Sodium citrate | 5 |
| Tributylphosphate (TBP) | 0.2 |
| Dibutylphosphate (DBP) | 0.2 |
| Kerosene | 0.02 |

All elements were introduced in the form of nitrates with the exception of Mo which was used as sodium molybdate.

During non-active tests, 10 g/l inactive Cs or, respectively, Sr were introduced.

EXAMPLE 2

161 g Portland cement (PC 35F) were mixed in a retort with 354 g $NaNO_3$ solution ($NaNO_3$ content of 90 g). Such a mixture has a water-cement number of 1.64 and contains 17.5% by weight of salt. In place of Portland cement, blast furnace cement, trass cement or pozzuolona cement may be used. Volume reduction by mixing/evaporation at 130°–180° C. resulted in evaporation of 215 g $H_2O$. The fixation mixture with a water-cement number of 0.3 and a salt content of 30 wt.% was easily transferred from the retort into prismatic forms wherein it hardened.

After 28 days storage time, the end products had dynamic elasticity-module values of 18–25 N/mm²; the crash resistance was 25–35 N/mm². The mechanical resistance of those products with a high salt content and low water-cement number is, consequently, comparable to, or better than, that of products with a 10% (by weight) salt content and water-cement numbers of 0.4 to 0.45 as they are known in the art.

Before evaporation and mixing, for example, 0.01 to 0.2 wt.%, of a known setting retardant or of a liquifier may be added to the mixture if an evaporation temperature at the lower end of the given range is selected, that is, if the mixing and evaporation period is relatively long. It is also possible to perform the mixing and evaporation step under vacuum so that the operating temperature is relatively low which is advantageous if premature setting must be avoided.

The results of this example show that solid products of cement with a low water-cement number (0.3) and a relatively high waste content (30% by weight), which values exceed those of products made in accordance with the state of the art, can be made in a continuous process in which the mixture of cement and aqueous waste has originally a high water-cement number (>1) but in which, during mixing, the water content is reduced, by evaporation, to the desired end value.

With a continuous process, residence times of the mixture in the mixer-evaporator of about 5–10 minutes can be obtained without problems (for comparison: bitumination—3 minutes) so that, under the selected conditions, premature setting and solidification of the mixture can be avoided.

Leach Resistancy

Diffusion coefficient (m²/s) for Co-137.

TABLE 2

| Product Composition Water-Cement Number = 0.4 PC = Portland Cement | NaCl Solution normal conditions) (at RT) | Quinary Solution normal conditions) (at RT) |
|---|---|---|
| PC 35F + 10 wt. % NaNO$_3$ | 8.1 × 10$^{-3}$ | 8.5 × 10$^{-14}$ |
| PC 35F + 10 wt. % NaNO$_3$ +5 wt. % Bentonite | 1.2 × 10$^{-13}$ | 1.5 × 10$^{-14}$ |
| PC 35F + 40 wt. % NaNO$_3$ | 4.5 × 10$^{-12}$ | 2.7 × 10$^{-13}$ |
| PC 35F + 40 wt. % NaNO$_3$ +5 wt. % Bentonite | 8.4 × 10$^{-15}$ | 1.0 × 10$^{-15}$ |

The results show that the leach resistancy of products with or without addition of Bentonite is similar. Samples with a high salt content benefit by the addition of Bentonite since they show a lower Cs release.

Corrosion Resistancy in Quinary Solution

Changes in the attenuation of the resonance frequency, that is, changes in the dynamic elasticity module (which is calculated from the attenuation) and changes in the weight of the samples, are employed as a measurement for progress of corrosion.

TABLE 3

| | | Sample weight (g) | | E-Module (N/mm²) | |
|---|---|---|---|---|---|
| Storage Time | | 10% Salt w/c = 0.4 | 45% Salt w/c = 0.25 | 10% Salt | 45% Salt |
| 0 days | PC 35F | 61.8 | 65.4 | 18.5 | 23.0 |
| 5 days | | 58.0 | 65.7 | 14.0 | 17.0 |
| 15 days | | 60.0 | 66.3 | 13.5 | 16.0 |
| 50 days | | 61.0 | 66.3 | 13.0 | 14.5 |
| 90 days | | 61.0 | 66.2 | 12.5 | 13.5 |
| 0 days | BFC 35L | 57.5 | 64.8 | 19.5 | 23.5 |
| 5 days | | 57.0 | 65.5 | 15.0 | 18.0 |
| 15 days | | 56.5 | 66.0 | 15.0 | 17.0 |
| 50 days | | 57.0 | 66.7 | 15.0 | 16.0 |
| 90 days | | 57.5 | 67.2 | 15.0 | 14.0 | w/c = water-cement number (wt. ratio)
PC = Portland cement
BFC = blast furnace cement From the test results listed, it may be seen that samples of PC 35F exhibit no differences and samples of BFC 35L exhibit only small differences in corrosion resistancy for different salt contents.

EXAMPLE 3

315 g of the concentrate (containing NaNO$_3$) of Table 1 in Example 1 were mixed with 140 g Portland cement 35F (w/c=1.6) and heated in an oil bath of 140° C., whereby 180 g H$_2$O were evaporated (in 4 hours). To the resulting viscous mixture 26 g of Na$_2$SiO$_3$·5H$_2$O was added and the mixture was then filled into prismatic forms. The samples showed the normal hardening progress. After 28 days hardening time, the dynamic E-module was comparable with that of products made in accordance with prior art methods. The composition of the solid end products was:

$$\left.\begin{array}{ll} 30\% \text{ by weight} & \text{salt} \\ 5\% \text{ by weight} & \text{Na}_2\text{SiO}_3 \\ 18.3\% \text{ by weight} & \text{H}_2\text{O} \\ 46.7\% \text{ by weight} & \text{cement} \\ \hline 100\% \text{ by weight} & \text{Product} \end{array}\right\} w/c = 0.4$$

EXAMPLE 4

380 g of a borate-containing solution, according to borate-containing waste water of a pressurized water nuclear reactor (Table 4) were mixed with 175 g cement and subjected to an oil bath at a temperature of 140° C. for 2 hours during which time 258 g H$_2$O was evaporated. The resulting flowable mixture was filled with prismatic forms wherein it exhibited a normal hardening progress. After 28 days, the dynamic E-module was 16 N/mm².

The composition of the solid end product was:

$$\left.\begin{array}{ll} 30\% \text{ by weight} & \text{salt} \\ 11.7\% \text{ by weight} & \text{H}_2\text{O} \\ 58.3\% \text{ by weight} & \text{cement} \\ \hline 100\% \text{ by weight} & \text{Product} \end{array}\right\} w/c = 0.20$$

The method according to the invention presents a simple solution especially for the disposal of boric acid concentrates. It has been necessary so far, for the fixation of these concentrates, to adjust the pH value of 11-12 by additives (NaOH or Ca(OH)$_2$) in order to obtain a solid end product. However, these additives degraded the quality of the product. With the method according to the invention, solid fixation end products can be obtained without additives and these end products exhibit better quality and have a lower w/c number.

TABLE 4

| CONCENTRATIONS IN g/l | |
|---|---|
| NaOH | 29 |
| H$_3$BO$_3$ | 180 |
| Na$_2$SO$_4$ | 30 |
| Na$_2$HPO$_4$ × 12H$_2$O | 5 |
| NaCl | 5 |
| Fe$_2$(SO$_4$)$_3$ | 5 |
| Cs$_2$SO$_4$ | 10 |
| Detergents (Hakar-Dekopur RS) | 5 |

We claim:
1. A solid fixation end product of harmful water-containing waste materials and cement (fixation matrix) which is resistant to leaching by water or salt solutions, said product being made by mixing the water-containing waste material and cement while they are subjected to evaporation to a degree that the end product, after subsequent setting, is characterized by
  (a) a content of harmful waste materials of 20 to 50% by weight on the basis of the dry weight of the waste materials in the end product, and
  (b) a content of water in the end product corresponding to a water-to-cement ratio (water-cement number) of 0.2 to 0.45.
2. A solid waste material end product as claimed in claim 1, wherein the waste material includes ion exchange resins charged with harmful compounds, characterized by an ion exchange resin content of 26 to 50%.
3. A solid end product of harmful water-containing waste materials and cement (fixation matrix) which is resistant to leaching by water or salt solutions, said product being obtained by mixing the water-containing waste material and cement while they are subjected to evaporation to degree that the end product, after subsequent setting, is characterized by
  (a) a content of harmful waste materials of 33-50% by weight on the basis of the dry weight of the waste materials in the end product, and

(b) a content of water in the end product corresponding to a water-to-cement ratio (water-cement number) of 0.20 to 0.40.

4. A method of producing solid fixation products of harmful water-containing waste materials and cement (fixation matrix) wherein the water-containing waste materials and the cement are mixed and, while being mixed, are subjected to evaporation at a temperature of 100° C. to 180° C. until sufficient water is evaporated so as to provide in the final fixation product a content of 20 to 50% by weight of waste material on the basis of the dry weight of the waste material in the fixation product and the mixture is then filled into forms for hardening.

5. A method according to claim 4, wherein the mixing and evaporation time is so adjusted as to obtain in the fixation product a water-to-cement ratio of 0.2 to 0.45.

6. A method according to claim 4, wherein evaporation and mixing is performed in a continuous manner in a continuous mixing apparatus.

7. A method according to claim 4, wherein evaporation and mixing is performed in a batch-wise manner in a vessel.

8. A method according to claim 4, wherein a setting retardant is added before the mixture is subjected to evaporation and mixing.

9. A method as claimed in claim 4, wherein evaporation and mixing is performed under a vacuum of 20 to 50 m bar.

* * * * *